Patented May 15, 1951

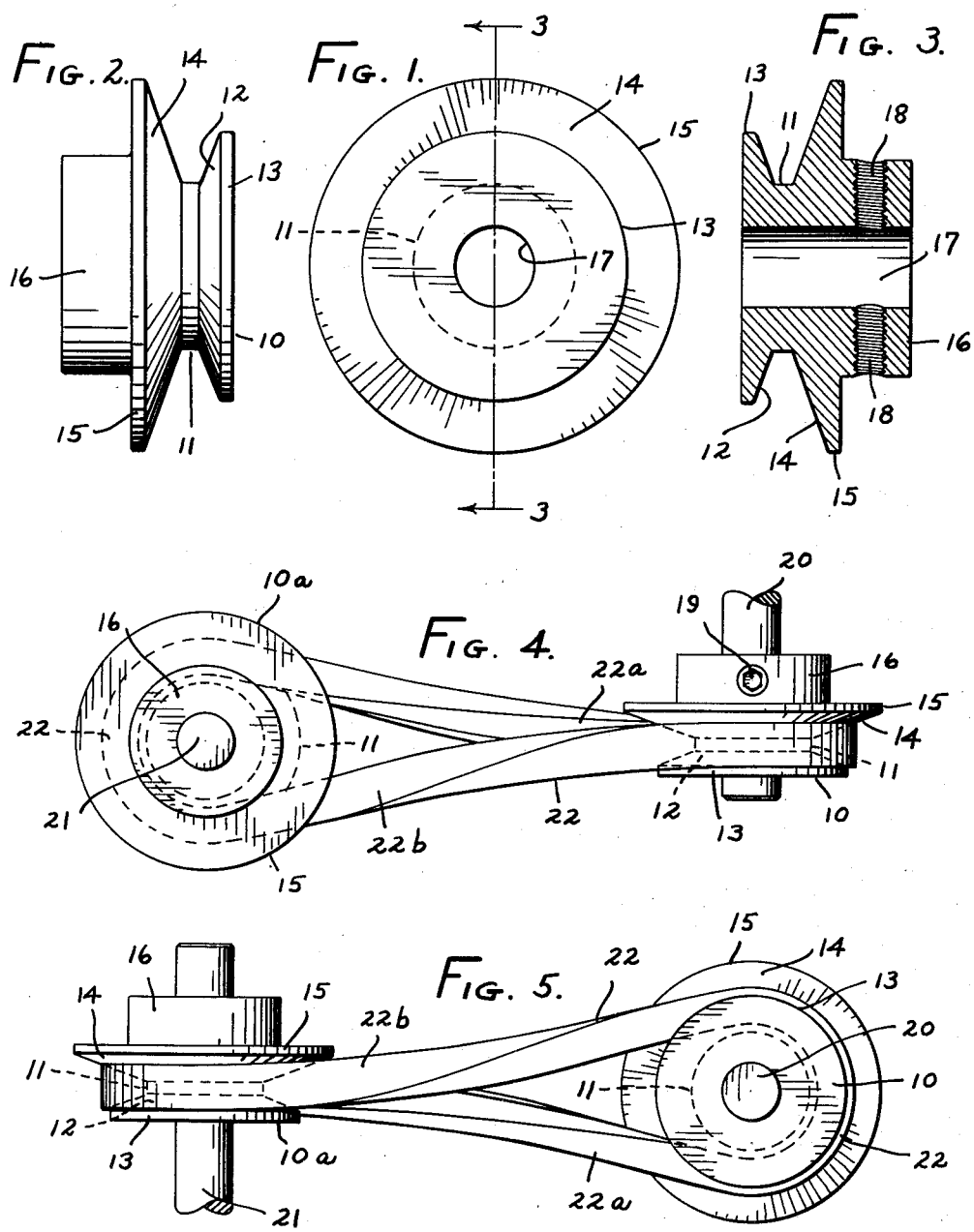

2,553,439

UNITED STATES PATENT OFFICE 2,553,439

V-BELT DRIVE PULLEY

William Carmichael, Knightsville, Ind.

Application May 25, 1949, Serial No. 95,295

3 Claims. (Cl. 74—219)

This invention relates to a V-belt drive and particularly to the pulleys involved therein. While the invention affords many advantages in a straight drive between parallel shafts, it becomes of increasing importance in drives requiring turns in the belt such for example as in driving from a vertical shaft to a horizontal shaft or the reverse.

There are two primary advantages in employing the invention, namely the fact that the wear on the belt in making turns such as in a one-quarter turn, is reduced to practically nothing, and also in the fact that there is no need for an exact alignment as between the driving and driven pulleys. That is, there may be misalignment to some little extent without any difficulty being encountered in keeping the belt on the pulleys, or in setting up wear on the belt itself.

The pulleys embodying the invention can be made in varying diameters depending upon the ratio of the drive desired, and the angularity of the side walls of the V around the pulley may be varied in accordance with the standards set up for the particular belts.

These and many other objects and advantages of the invention including the extreme simplicity of construction, will become apparent to those versed in art in the following description of one particular form of the invention as illustrated in the accompanying drawing, in which Fig. 1 is a view in front elevation of a pulley embodying the invention;

Fig. 2, a view in side elevation;

Fig. 3, a view in diametrical section through the pulley on the line 3—3 in Fig. 1;

Fig. 4, a view in top plan of a driving system wherein the drive is from a horizontally disposed shaft to a vertically disposed shaft; and Fig. 5, a view in side elevation of the structure illustrated in Fig. 4.

Referring to the drawing in which like characters of reference indicate like parts throughout the several views, a pulley generally designated by the numeral 10 is formed to have a V groove 11 circumferentially therearound. One side wall 12 of the groove 11 is carried outwardly to terminate in a cylindrical flange 13. The other side wall 14 of the groove 11 is carried in a continuous frusto-conical manner to terminate by its outer portion in a cylindrical flange 15, the diameter of which greatly exceeds the diameter of the flange 13. A mounting hub 16 is provided to the side of the cylindrical flange 15, and the pulley 10 is provided with the shaft receiving bore 17 therethrough. The pulley may be secured in any suitable manner, herein shown as by means of screw-threads 18 carried through the hub 16 to open into the bore 17, wherein a set screw, Fig. 4, indicated by the numeral 19 may be entered and forced against the shaft 20, for example.

In the form shown in Fig. 3, there are two sets of threads 18, diametrically opposed to each other.

Referring to the one specific form of drive indicated in Figs. 4 and 5, a driving pulley 10 is mounted on the shaft 20 as just indicated. For the sake of illustration, this shaft 20 is disposed horizontally. Then in spaced relation from the shaft 20 there is provided a vertically disposed shaft 21 on which a pulley 10a is fixed.

A V-belt 22 is mounted to fit in the grooves of the two pulleys with the quarter turn required. It will be assumed that the horizontal shaft 20 is turning in a counter-clockwise direction. This means that the belt 22 is leaving the pulley 10 from the top side and returning to it from the underside. In this case, the large diameter flange 15 is mounted in the manner indicated in Figs. 4 and 5, wherein the top flight of the belt 22 will be on the forward side of that wall 14 which terminates in the flange 15. It is to be noted, Fig. 5, in relation to the pulley 10, that the belt 22 extends in the normal manner radially beyond the flange 13. However, the wall 14 extends for a considerable distance above and away from the outer side of the belt 22.

It is further to be noted, that the underside flight 22a as it approaches the pulley 10 will bear against the side wall surfaces 14 intermediate the outer portion thereof at the cylindrical surface 15 and the bottom of the groove 11. That is, this under flight 22a does not rub or ride over any marginal flange of either side wall 12 or 14 of the pulley 10, but instead strikes the surface of the wall 14 so that there is an area of contact rather than a line of contact, which fact means that there is no sharp edge cutting into the belt.

In the same manner, the upper flight 22b of the belt 22 as it approaches the pulley 10a comes in from the side so that it will strike the wall 14 intermediate the outer cylindrical flange 15 and the bottom of the groove 11 so that the belt will be straightened up to enter the groove 11 by sliding on this surface 14 instead of cutting over on an edge of either one of those walls 12 or 14. Thus it is to be seen that as the belt portions approach the two pulleys, they come into contact with those surfaces of the walls 14 in each instance and are not brought over the sharp edge of the wall 12 in either case The pulley 10 may be adjusted along the shaft 20 within fractions of an inch and likewise the pulley 10 may be adjusted along its shaft 21 within fractions of an inch so that the alignment to cause the belt flights 22a and 22b to strike those surfaces of the side wall 14 in each instance is had without making any micrometer adjustments. Furthermore by reason of the use of the high side 14 conjunction with the low side 12, in each of the driving and driven pulleys, it is practically impossible to cause the belt 22 to jump off of those pulleys and therefore the belt 22 does not need to be drawn up so tight that it would produce undue wear as frequently is the case in making these drives where the belt is turned.

While I have herein shown and described my invention in the one particular form, it is obvious that changes may be made without departing from the spirit of the invention, and I therefore do not desire to be limited by that precise form beyond the limitations which may be imposed by the following claims.

I claim:

1. A V-belt driving system comprising a driving shaft; a driven shaft; a pulley on the driving shaft having a V-groove therearound defined between oppositely outwardly flaring frusto-conical belt bearing side wall surfaces, one of said surfaces having a greater major base diameter than that of the other; a like pulley on said driven shaft; and a V-belt engaging around both of said pulleys fitting within said grooves thereof and bearing by its side walls against the respective pulley groove surfaces; the outer side of the belt being at a greater radial distance from the pulley axis of rotation than that of the minor outer diameter wall surface, and being at a lesser radial distance than that of said major diameter wall surface.

2. A V-belt driving system comprising a driving shaft; a driven shaft; a pulley on the driving shaft having a V-groove therearound defined between oppositely outwardly flaring frusto-conical belt bearing side wall surfaces, one of said surfaces having a greater major base diameter than that of the other; a like pulley on said driven shaft; and a V-belt engaging around both of said pulleys fitting within said grooves thereof and bearing by its side walls against the respective pulley groove surfaces; the outer side of the belt being at a greater radial distance from the pulley axis of rotation than that of the minor outer diameter wall surface, and being at a lesser radial distance than that of said major diameter wall surface; said driven shaft being disposed at an angular position from the driving shaft requiring a turn in said belt; and said pulleys being mounted on their respective shafts to have the flight of the belt moving toward the pulley in each instance enter that pulley groove by side wall contact with the surface of said major diameter surface prior to the opposite belt side contacting the other wall surface.

3. A V-belt driving system comprising a driving pulley; a driven pulley; each of said pulleys having a V-groove around its periphery; a V-belt wrapped around said pulleys to ride in said V-grooves; said grooves being defined by pulley flanges diverging outwardly, laterally one from the other to define opposing frusto-conical belt contact surfaces; one of said flanges being a greater flange on each pulley to extend outwardly to terminate in a circumference of greater diameter than that of the opposing lesser flange; said pulleys being disposed in relation to each other in respect to their greater and lesser flanges to have the belt in each instance leave one pulley and approach the other pulley to bear initially laterally against said greater flange prior to bearing against the lesser flange.

WILLIAM CARMICHAEL.

REFERENCES CITED

The following references are of record in the file of this patent:

UNITED STATES PATENTS

| Number | Name | Date |
|---|---|---|
| 2,124,422 | Klein et al. | July 19, 1938 |
| 2,180,065 | O'Brien | Nov. 14, 1939 |
| 2,347,798 | Reiling | May 2, 1944 |